United States Patent

[11] 3,572,850

| [72] | Inventor | Harold B. Schultz<br>South Bend, Ind. |
|---|---|---|
| [21] | Appl. No. | 747,256 |
| [22] | Filed | July 24, 1968 |
| [45] | Patented | Mar. 30, 1971 |
| [73] | Assignee | The Bendix Corporation |

[54] PRESSURE RESPONSIVE SPLITTER VALVE
7 Claims, 3 Drawing Figs.

[52] U.S. Cl. .................................................. 303/84,
137/625.49, 303/6
[51] Int. Cl. ................................................... F16k 11/04,
F16k 11/06
[50] Field of Search .......................................... 137/625.49,
111, 118, 112; 303/84 (A), 6

[56] References Cited
UNITED STATES PATENTS

| 2,049,984 | 8/1936 | Vorech et al. | 137/111X |
| 2,579,116 | 12/1951 | Hirvonen | 137/111X |
| 3,448,230 | 6/1969 | Bueler | 303/84X |
| 3,322,134 | 5/1967 | Enemark | 137/118X |
| 3,323,533 | 6/1967 | Reimer | 137/118X |

FOREIGN PATENTS

| 33,331 | 5/1924 | Denmark | 137/625.49 |
| 551,540 | 11/1956 | Italy | 137/625.49 |

*Primary Examiner*—M. Cary Nelson
*Assistant Examiner*—Michael O. Sturm
*Attorneys*—Richard G. Geib and Plante Arens, Hartz and O'Brien ABSTRACT: A control device in a braking system for scheduling hydraulic pressures from separate sources to front and rear wheel brakes with equal intensity. A housing with separate inlet and outlet ports for each system has a resiliently biased valve member which extends into a control chamber. The control chamber is connected to one of the sources of hydraulic pressure. When the pressure in the control chamber reaches a predetermined value the resilient member collapses allowing the valve to move. The valve upon moving closes the communication of one inlet port and opens the discharge ports to the other source of hydraulic pressure assuring the same line pressure in the different wheel brake systems.

INVENTOR.
HAROLD B. SCHULTZ
BY
Richard G. Geib
ATTORNEY

PRESSURE RESPONSIVE SPLITTER VALVE

In prior art devices, and more recently in view of the Federal Safety Legislation, much emphasis has been placed on segregating the hydraulic actuating sections of vehicle brakes. More particularly, it has been the practice to separate the front and rear brakes of an automotive vehicle. In so doing, many of the prior art devices, such as is seen in U.S. Pat. Nos. 3,183,670 and 3,283,505, created not only separate systems, but also the possiblity of differing pressures therebetween.

The object of this invention is, therefore, to eliminate the problem of different pressures in separate hydraulic systems under normal operating condition. The elimination of different pressures is a necessity in antiskid equipped automobiles, and the ability to bleed off small amounts of fluid from a pressure supplied system permits simplified control of an antiskid system.

More particularly, it is an object of this invention to provide a valve which senses the adequacy of one source of hydraulic pressure used to control working of two or more hydraulic devices, and separate same, and cut in a second hydraulic pressure source for one device maintaining the other device under control of the first source whenever the pressure of the first source drops below a predetermined value so that there is a reversion to a manual displacement split system in case of power failure.

DRAWING DESCRIPTION

Other objects and advantages of this invention will appear from the following description of the drawings in which.

Figure 1:
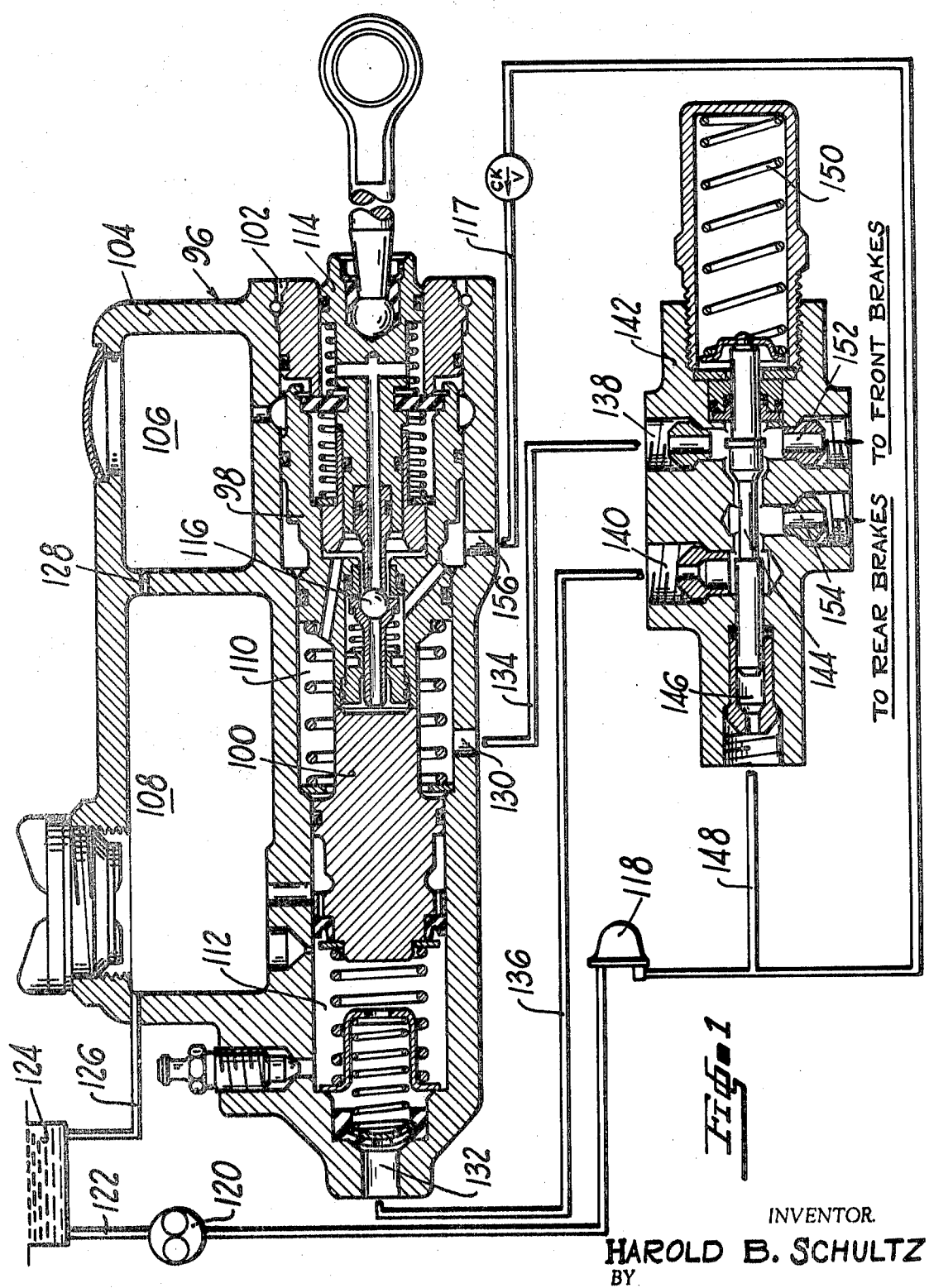
FIG. 1 is a drawing of a braking system with a brake control valve shown in cross section and including a cross-sectional view of a splitter valve in the system in accordance with the principles of this invention.

With respect now to FIG. 1 there is shown a modified control valve 96 embodying a valve piston 98 and a floating piston 100 within a stepped bore 102 of the valve housing 104. The valve housing is constructed to provide reservoir cavities 106 and 108 for replenishing primary chamber 110 and secondary chamber 112 in the released attitude of the valve piston 98 and floating piston 100. The valve piston includes a valve plunger mechanism 114 and a poppet valve 116 which are arranged to be movable relative to one another to control the supply of hydraulic pressure coming via conduit 117 from the accumulator 118 being supplied by pump 120. This fluid is directed to the pump 120 by a conduit 122 leading from a reservoir 124 that is connected by conduit 126 to the reservoir 108 and via passage 128, reservoir 106. The housing 104 is provided with a discharge port 130 from the primary chamber 110, and a discharge port 132 from the secondary chamber 112. Conduits 134 and 136 connect these discharge ports to the inlets 138 and 140 of valve 142, which is similar in every detail to valve 42 of the piston shown in FIG. 3 and explained in more detail hereinafter. Generally speaking, a valve spool 144 within the housing 142 is controlled by hydraulic pressure in chamber 146 being directed thereto via conduit 148 from the accumulator 118 to operate the spool 144 in opposition to spring 150 to the position whereby the inlets 138 and 140 are separated and connected, respectively, to outlet discharge ports 152 and 154 which are connected, respectively, to the front brakes and to the rear brakes, as noted on the drawings.

DETAILED DESCRIPTION

Figure 2:
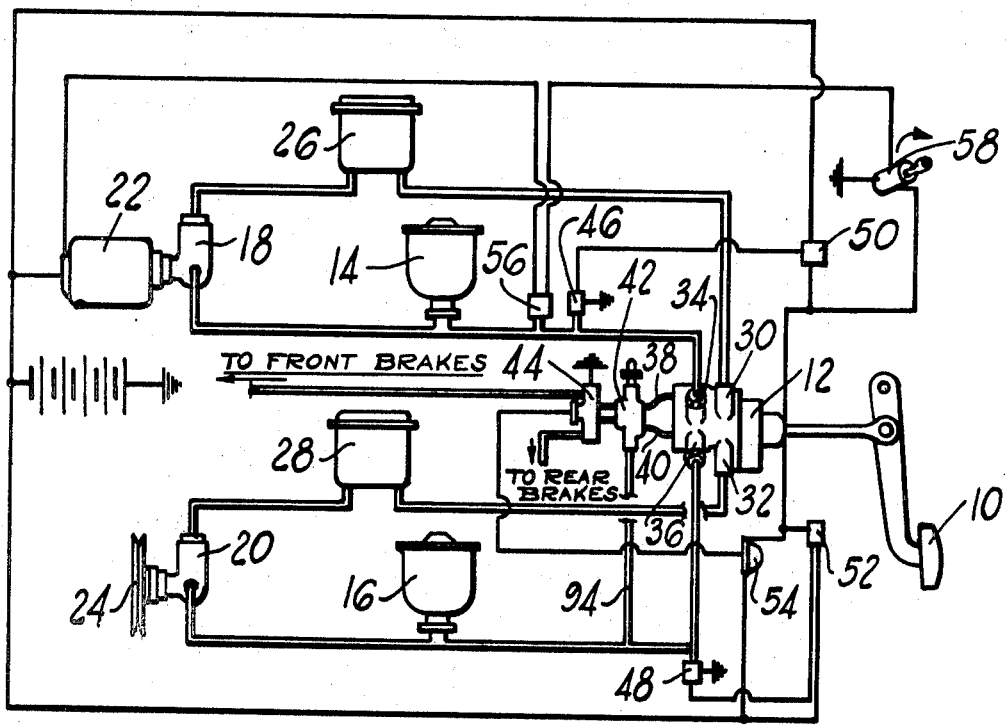
FIG. 2 is a schematic illustration of a full power hydraulic braking system inclusive of a valve in accordance with the principles of this invention.

With respect now to FIG. 2 there is shown a brake pedal 10 for actuating a hydraulic control valve 12 for developing hydraulic pressure to the front brakes and the rear brakes via the appropriately labeled conduits. This valve 12 receives hydraulic pressure from separate accumulators 14 and 16 which are pressurized by separate pumps 18 and 20. These pumps are designed to be separately driven, namely pump 18 is driven by an electric motor 22 and pump 20 is driven by a belt drive from the vehicle engine about pulley 24. Each of the pumps has a separate reservoir such as reservoirs 26 and 28, respectively, which are also connected by conduits to the brake control valve 12 at separate return ports 30 and 32 of the housing therefor. The fluid pressure from the pumps is supplied to separate inlet ports 34 and 36 of the housing and the pressure is delivered from the valve 12 via separate conduits 38 and 40 to a valve 42 wherefrom it is delivered to a pressure differential warning switch 44 and thence to the front and rear brakes by the appropriately labeled conduits. Pressure warning switches 46 and 48 operate indicators 50 and 52, respectively, which are visible to the operator of the brake pedal 10 whenever the pumps 18 and/or 20 are incapable of developing a sufficient pressure for braking the vehicle. In addition an indicator 54 is operatively connected to the pressure differential switch 44 to be actuated whenever there is a differential pressure between the front and rear brakes. Another pressure responsive switch 56 is included in the conduit leading from the accumulator 14 to the inlet port 34, and this switch is operatively interposed in the electrical circuitry for the electric motor 22 driving the pump 18 so that it may be actuated only when there is insufficient pressure available from the accumulator 14 for the purposes desired. Completing this system description, an ignition switch 58 is operatively interposed with the vehicle's electrical system and the warning devices so that it may test the indicators of the warning system whenever the ignition switch is operated to start the vehicle's engine.

Figure 3:
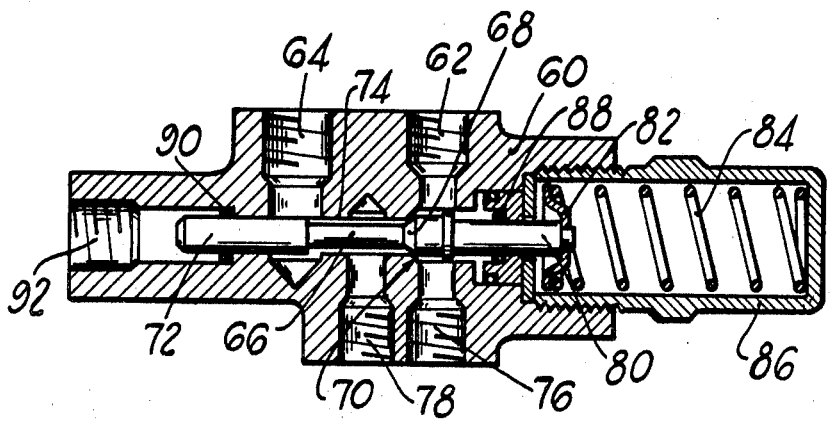
FIG. 3 is a cross-sectional view of a valve in accordance with the principles of this invention such as may be utilized in FIG. 1.

With respect to a detailed description of the valve 42 the reader's attention is directed to FIG. 3 showing the valve to comprise a housing 60 provided with fluid inlet ports 62 and 64 respectively connected to the conduits 38 and 40 of FIG. 2. Within the housing a valve spool 66 is arranged to have a conical valve face 68 facing a machined valve seat surface 70 of a longitudinal bore in the housing 60. In addition the valve spool 66 has a pressure responsive end 72 supported by the longitudinal bore of the housing 60 and sized so as to seal with respect to surface 74 of the bore in the housing 60 whenever it is moved to underlie surface 74. The valve housing 60 also is provided with discharge ports 76 and 78, which are aligned with respect to the inlet ports 62 and 64 to be in communication therewith whenever the valve spool 66 is in the attitude shown in FIG. 3. End 80 of the valve spool is adapted to receive a spring retainer 82 on which a spring 84 is caused to bear by the threading of a cap 86 to the housing 60. However, prior to this assembly a bearing seal 88 is inserted into the large end of the bore through the housing 60 to support and seal the valve plunger 66 at that end. In addition, it should be noted that an O-ring 90 is placed in the housing 60 to be about the end 72 of the spool 66 to seal with respect to the spool.

The housing 60 is also provided with a tapped opening 92 to which a conduit 94 leading from the pressurized conduit from the accumulator 16 is attached, so that the hydraulic pressure available in the valve 12 from the pump 20 is referenced onto the end 72 of the spool 66.

OPERATION

In operation the vehicle operator of either the system shown in FIG. 1 or the system shown in FIG. 2 will upon starting up the vehicle's engine pressurize accumulators 118, 14 or 16. Thereafter the accumulators should maintain the charge and store an adequate supply of pressurized hydraulic fluid for the brake valves 96 or 12.

When it is desired to stop the vehicle, the operator will depress a brake pedal, such as pedal 10 in a system of FIG. 2, to port separate hydraulic pressures via conduits 134 and 136 or 38 and 40 to the valves 142 or 42. When the valves 142 or 42 have an adequate pressure supplied thereto from the accumulator 16, valve spools 144 or 66 will be moved to the right.

The pressure being delivered via the conduits 136 or 38 to the inlets 140 or 64 of the valves will thus be blocked in that the pressure responsive end (end 72 of FIG. 3) cooperate with the bore in the valve housing 60, such as surface 74 of FIG. 3. At this time the valve faces, such as face 68, will be moved off the valve seats, such as seat 70, so that the pressure from the conduits 134 or 40 delivered to the inlets 138 or 62 will be ported to both discharge ports 76 and 78, 152 and 154 or to the respective brakes. As shown in FIG. 2, the pressure differential switch 44 may be interposed in this communication to the brakes to compare the pressures being thus delivered to indicate to the operator of any brake pressure differences to show any failures in the brake system. In the event of a failure of the accumulators 118 or 16 to maintain an adequate hydraulic pressure in the braking systems, valve spools 144 or 66 will be moved by the springs 150 or 84 to segregate the inlets and the discharge ports of the valve housing to revert to the manual split system capability of FIG. 1 or partial system capability with the structure of FIG. 2 possible as a safety feature with this system.

The operation of the valve 96 controlling the FIG. 1 braking system, has the brake pedal operating the valve plunger 114 to displace the poppet 116. When this occurs, hydraulic pressure, from the accumulator 118 the inlet port 156, is ported to the primary chamber 110. The pressure thus made available to the primary chamber 110 will be communicated to the conduit 134 and, at the same time, actuate the floating piston 110 to seal off the communication of the reservoir 108 with the secondary chamber 112 and thereafter pressurize the secondary chamber 112 to deliver hydraulic pressure via the conduit 136. In that the pressure of chamber 112 is a function of pressure in chamber 110 it is not equal thereto. Therefore, with an antiskid control applied to the brakes, there would be a necessity to involve other than bleeding type skid control means if it were not for the fact that valve 142 was placed in the system.

Having fully described an operative construction of the conception structure form with which my invention is concerned, it is now desired to set forth the intended protection sought by the appended claims as follows:

I claim:

1. A valve for regulating fluid pressures from different sources supplied to separate hydraulic systems, said valve having:

a housing with inlets ports for receiving fluid pressures from said different sources, separate inlet chamber means separated by a bore, a reference pressure chamber in communication with fluid pressure from one of said different fluid pressure sources and separate discharge ports; and control means in said bore acted upon by the fluid pressure in said reference chamber and an opposing means for applying a predetermined bias, said control means functioning to supply said separate discharge ports with fluid from one of said pressure sources in response to an increase in the pressure in the reference chamber sufficient to overcome said predetermined bias.

2. The structure of claim 1 wherein one discharge port is communicated by passage means to said bore between the separate inlet chambers and the other discharge port is communicated to one inlet chamber.

3. The structure of claim 2 wherein the control means includes a spool-type valve both ends of which are sealingly supported by the housing with one end projecting into said reference pressure chamber, said spool-type valve having intermediate its ends valve face means cooperating with said bore to provide separate flow paths in one attitude commingled flow from the inlet ports to the discharge ports in another attitude and a segregated flow path from one inlet port to all discharge ports in another attitude.

4. The structure of claim 3 wherein said spool-type valve has on its other end a means to mount a spring operatively connected to said housing by an adjustable means to permit regulation of the spring load on said spool-type valve.

5. A control device in a braking system for regulating fluid pressure from separate hydraulic systems operating the front and rear wheel brake assemblies, said device comprising:

a housing having a bore therein;

inlet ports in said housing connected to said hydraulic systems;

outlet ports in said housing connected to said front and rear wheel brake assemblies;

a reference chamber in said housing pressurized by fluid from one of said hydraulic systems; and valve means in the bore of said housing moving in response to the pressure in the reference chamber from a first position where fluid flows directly from each inlet to each outlet, to a second position where the fluid flow to one inlet if blocked while permitting the fluid flow through the other inlet to supply said outlets with the same fluid pressure to operate said brake assemblies.

6. A device in a braking system for regulating the supply of hydraulic fluid pressure from a split system with booster means to separate distributing systems with equal intensity, said device comprising:

a housing having inlet ports communicated to a bore through said housing, said inlet ports being connected to said split system with booster means and outlet ports open to said bore, one of which is between said inlet ports and the other directly opposite one of said inlet ports, said outlet ports being connected to said separate distributing systems, said housing being provided with a control chamber at one end, said control chamber receiving fluid pressure from said booster means; and valve means resiliently urged toward said control chamber permitting the hydraulic fluid pressure to flow directly through the inlet ports to the outlet ports until the pressure in the control chamber overcomes the resilient force and moves said valve means closing one inlet port while permitting the fluid pressure supplied to the other inlet port to be communicated to the outlet ports for each distributing system with the same fluid pressure.

7. A device, as recited in claim 6, wherein said valve means includes a spring member retained by an adjustable cap for varying the resilient force on said valve.